Patented Jan. 21, 1941

2,229,562

UNITED STATES PATENT OFFICE 2,229,562

PROCESS FOR PREPARING ZINC DITHIOCARBAMATES

Albert J. Gracia, Cuyahoga Falls, Ohio, assignor to Wingfoot Corporation, Wilmington, Del., a corporation of Delaware No Drawing. Application February 15, 1939, Serial No. 256,524

5 Claims. (Cl. 260—429)

This invention relates to a method of preparing dithiocarbamates. More particularly, it relates to zinc dithiocarbamates of improved appearance and applicability and a process for preparing them.

Zinc salts of dithiocarbamic acids are a well known class of chemical compounds which have found application as accelerators of the vulcanization of rubber among other uses. One of the widely used methods of preparing such compounds, the method being particularly applicable to the preparation of such dithiocarbamates derived from alkyl amines, involves as the first step the preparation of a soluble dithiocarbamate by reacting the amine with carbon bisulfide and a base such as an alkali metal or ammonium hydroxide which will yield the dithiocarbamate in water soluble form. The zinc dithiocarbamate is then precipitated from the solution of the soluble dithiocarbamate by adding zinc chloride or some other zinc compound which makes the zinc ion available for precipitation. This process is relatively simple and satisfactory in most respects. However, although the reaction can be carried out substantially quantitatively by reacting the exact proportions of starting materials to yield the desired compound, it is difficult to provide exactly these theroetical proportions in commercial operation by reason of possible errors in weighing, analysis, processing losses, and the like, as ordinarily encountered. Furthermore, in view of the fact that the amine is relatively costly as compared with the other starting materials, it is customary in practice to use slight excesses of the carbon bisulfide and the base in producing the soluble dithiocarbamate. When such excesses are employed, the resulting solution of the soluble dithiocarbamate is usually quite strongly colored, this color naturally and spontaneously developing particularly when the reaction is carried out at ordinary temperatures, such as room temperature and above, and particularly when the solution must stand for any great length of time. This coloring matter which is formed is soluble and cannot be filtered off. Moreover, on the subsequent precipitation of the zinc dithiocarbamate, the latter is also colored. This coloration of the final product resists bleaching and is obviously disadvantageous for many commercial applications. For example, when the material is to be used as an accelerator of vulcanization, this coloration is decidedly objectionable in the compounding of white or light rubber stocks. Therefore, it is of considerable importance to prevent or remove this coloring material.

It has been found that a simple mixture of carbon bisulfide and a base such as an alkali metal hydroxide or ammonium hydroxide will, under the conditions employed for the preparation of the dithiocarbamates, react to form the coloring materials. It is possible that the material formed by this reaction and which causes the coloration in the solution of the soluble dithiocarbamate is a tri-thiocarbonate. A possible mechanism by which such a compound could be formed is illustrated by the following equation:

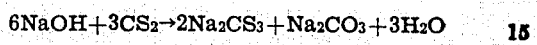

$$6NaOH + 3CS_2 \rightarrow 2Na_2CS_3 + Na_2CO_3 + 3H_2O$$

If, in fact, it is sodium tri-thiocarbonate or an analogous salt of tri-thiocarbonic acid which is formed and causes the coloration of the soluble dithiocarbamate solution, it is probable that, on the addition of zinc ions, a zinc tri-thiocarbonate is formed by co-precipitation with the zinc dithiocarbamate. This reaction may be illustrated by the following equation:

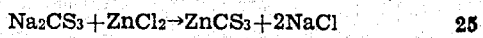

$$Na_2CS_3 + ZnCl_2 \rightarrow ZnCS_3 + 2NaCl$$

Whatever the character and mechanism of formation of the coloring materials, it has been discovered according to the present invention that the coloration may be destroyed in one step of the reaction and prevented in another by the use of an oxidizing agent. However, the oxidation must be carried out at a particular place in the process in order to be effective. For example, if the zinc dithiocarbamate is prepared according to the usual procedure with the use of slight excesses of carbon bisulfide and a base, such as sodium hydroxide, with a resulting coloration of the zinc dithiocarbamate, treatment of the colored zinc dithiocarbamate with an oxidizing agent is substantially ineffective and the color is not sufficiently discharged to render the material generally suitable for use, as in white rubber stocks and the like. On the other hand, if the solution of the soluble dithiocarbamate is treated with the oxidizing agent before the zinc salt is added, the color of the solution is discharged and on subsequent precipitation of the zinc dithiocarbamate the latter is also free from coloration. The zinc dithiocarbamates are, as a class, substantially white compounds when not contaminated with coloring impurities. According to the practice of the present invention they may be obtained with relative ease as consistently dead white materials.

The practice of the invention is illustrated by a comparison of the following examples.

Example 1

Four hundred and eight pounds of a 50% solution of sodium hydroxide were added to 275 pounds of water and 225 pounds of dimethyl amine, in aqueous solution, were then stirred in, followed by 388 pounds of carbon bisulfide. The mixture was stirred for four hours at 30° C., developing a decided yellow to salmon-red color. To the solution of sodium dimethyl dithiocarbamate so formed, 374 pounds of zinc chloride in the form of a 10% solution were added to precipitate zinc dimethyl dithiocarbamate. This compound was also distinctly yellow.

Example 2

Carbon bisulphide, dimethyl amine and sodium hydroxide were reacted as in Example 1 to form a solution of sodium dimethyl dithiocarbamate, the solution being yellow to salmon-red in color. To the mixture was added a solution of ammonium persulfate with stirring until the yellow color was just discharged. This addition was conducted in the manner of a titration, the discharge of the color being similar to the change in color of an indicator during a titration. A further and more specific analogy in this respect is the titration of a base with an acid using phenolphthalein, the pink color of the indicator being completely discharged when the end compound is reached. The amount of oxidizing agent added should preferably be just enough to discharge the color and no more since addition of any excess results in precipitation of insoluble thiuram disulfide formed by oxidation of the soluble dithiocarbamate. However, if the color is just barely discharged there will ordinarily be no substantial formation of thiuram disulfide, the oxidation apparently being highly selective as between the coloring matter and the dithiocarbamate. In practice the above quantities of reactants will require about 10–14 pounds of ammonium persulfate to effect the discharge of the color. When the solution had been decolorized in this manner, zinc chloride was added to the solution and blank white zinc dithiocarbamate precipitated.

If, in fact, the color is imparted by a salt of trithiocarbonic acid the discharge of the coloration may take place as indicated by the following equation:

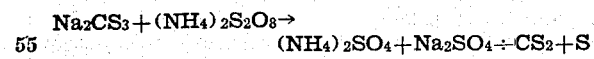

$$Na_2CS_3 + (NH_4)_2S_2O_8 \rightarrow (NH_4)_2SO_4 + Na_2SO_4 + CS_2 + S$$

If the mechanism is as shown by this equation, a small amount of sulfur is formed during the bleaching. This sulfur, however, is apparently in highly colloidal form, in which it is white and has no discoloring effect on the product.

When the zinc dimethyl dithiocarbamate is prepared according to Example 1 and then treated with ammonium persulfate, no noticeable discharge of the yellow color takes place.

Although the practice of the invention has been particularly illustrated in connection with the preparation of zinc dimethyl dithiocarbamate, it is equally applicable to the preparation of other zinc dithiocarbamates. Thus, various aliphatic amines may be substituted for the dimethyl amine in the examples. These include amines in which the aliphatic groups are straight or branched chain, or substituted by aryl or heterocyclic radicals, or they may be cycloaliphatic groups. Illustrative examples of such amines are diethyl amine, di-N-butyl amine, isobutyl amine, cyclohexyl amine, furfuryl amine, tetrahydrofurfuryl amine, difurfuryl amine, dibenzyl amine, di(isopropyl) amine, piperidine, N-ethyl cyclohexylamine, etc.

Other bases such as potassium hydroxide and ammonium hydroxide may likewise be employed instead of the sodium hydroxide of the examples.

Although aromatic amines do not generally react with sodium hydroxide, or the like, and carbon bisulfide as in the examples, the invention is applicable to the preparation of such zinc dithiocarbamates whenever it is possible so to react the aromatic amines. In addition, such amines may be reacted to form dithiocarbamates by other processes in which the same objectionable formation of coloring matter occurs. For example, diphenyl amine may be reacted with metallic sodium to replace the hydrogen of the amine with a sodium atom. This product is then reacted with carbon bisulfide to produce, by addition, sodium diphenyl dithiocarbamate. This procedure may be illustrated by the following equations:

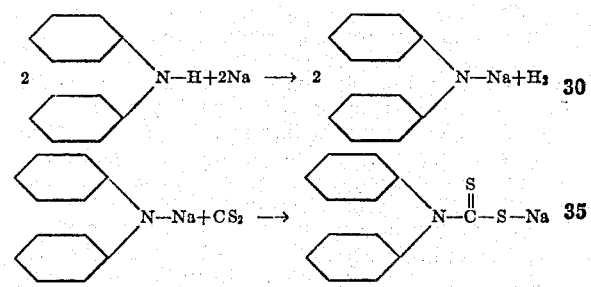

In the practice of this process, if the diphenyl amine contains water or water otherwise gets into the process to react with the metallic sodium, sodium hydroxide will be formed. This sodium hydroxide will then react with any excess carbon bisulfide in the second step of the reaction to color the product in exactly the same manner as if the material had been prepared according to the process illustrated by Examples 1 and 2. Therefore, the present invention is equally applicable to this process or any analogous process by which such coloring matters are produced.

Various other oxidizing agents may be employed in the place of the ammonium persulfate of Example 2. In selecting the oxidizing agent, it is preferred that the agent itself should not have any coloring effect. In addition, strongly acidic oxidizing agents should generally be avoided since they tend to decompose the dithiocarbamate. The following are representative of materials eminently suited for use in practice of the invention: hydrogen peroxide, sodium perborate, sodium peroxide, potassium persulfate, sodium persulfate, chlorine, etc.

Although only the preferred embodiments of the invention have been described in detail, it will be apparent to those skilled in the art that various modifications may be made therein without departing from the spirit of the invention or the scope of the appended claims in which it is intended to cover by suitable expression all features of patentable novelty residing in the invention.

What I claim is:

1. A method of preparing zinc dimethyl dithiocarbamate which comprises reacting dimethyl amine, carbon bisulfide and sodium hydroxide to form sodium dimethyl dithiocarbamate, adding an oxidizing agent in quantity only sufficient to discharge the color thereof, and then adding a zinc compound to precipitate the zinc dithiocarbamate.

2. In a method of preparing zinc dithiocarbamates, the series of steps comprising preparing a sodium dithiocarbamate, adding an oxidizing agent thereto until the color thereof is just discharged, and then precipitating the zinc dithiocarbamate.

3. A method of preparing a zinc dithiocarbamate which comprises reacting an alkyl amine with a slight excess of carbon bisulfide and a base selected from the group consisting of alkali metal and ammonium hydroxides, adding an oxidizing agent to just barely discharge the color thereof, and then precipitating the zinc dithiocarbamate.

4. In a method of preparing a zinc dithiocarbamate, the series of steps comprising reacting an amine with an excess of carbon bisulfide and a base selected from the group consisting of alkali metal and ammonium hydroxides, adding an oxidizing agent in quantity sufficiently only to discharge the color thereof, and then precipitating the zinc dithiocarbamate.

5. In a method of preparing a zinc dithiocarbamate which comprises preparing a water soluble dithiocarbamate in the presence of excess amounts of carbon bisulfide and a base selected from the group consisting of alkali metal and ammonium hydroxides, the steps comprising adding an oxidizing agent to the water soluble dithiocarbamate in quantity only sufficient to discharge the color thereof, and then precipitating the zinc dithiocarbamate.

ALBERT J. GRACIA.